US012518605B1

(12) United States Patent
Minsley et al.

(10) Patent No.: US 12,518,605 B1
(45) Date of Patent: Jan. 6, 2026

(54) SYSTEM AND METHOD FOR PREMISES MONITORING

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

(21) Appl. No.: 18/941,609

(22) Filed: Nov. 8, 2024

(51) Int. Cl.
*G08B 13/196* (2006.01)

(52) U.S. Cl.
CPC ... *G08B 13/19613* (2013.01); *G08B 13/1965* (2013.01)

(58) Field of Classification Search
None
See application file for complete search history.

(56) References Cited

U.S. PATENT DOCUMENTS

| | | | |
|---|---|---|---|
| 8,125,329 B1* | 2/2012 | Hirou | G08B 13/19697 358/1.15 |
| 9,756,233 B2 | 9/2017 | Lee et al. | |
| 10,854,067 B1* | 12/2020 | Giles | G08B 7/06 |
| 11,295,139 B2 | 4/2022 | Khadloya et al. | |
| 11,745,870 B1* | 9/2023 | Nevdahs | G08B 13/1965 244/17.13 |
| 12,333,880 B1* | 6/2025 | Dumey | G07C 9/29 |
| 2007/0182540 A1* | 8/2007 | Marman | G06V 20/52 340/541 |
| 2010/0001859 A1* | 1/2010 | Sharma | G08B 13/08 340/545.1 |
| 2017/0359507 A1* | 12/2017 | Lee | H04N 23/63 |
| 2018/0245375 A1* | 8/2018 | Arlinghaus | E05B 63/246 |
| 2022/0005332 A1* | 1/2022 | Metzler | G06F 18/2431 |
| 2022/0157139 A1* | 5/2022 | Subramany | G08B 13/19613 |

FOREIGN PATENT DOCUMENTS

WO 2017065347 4/2017

* cited by examiner

*Primary Examiner* — Rebecca A Volentine
(74) *Attorney, Agent, or Firm* — Williams Mullen; Thomas F. Bergert

(57) ABSTRACT

Embodiments of the present disclosure establish a premises monitoring system including an image recognition system that can detect a closed status and an ajar status for a closure device at a premises. The detection can be, for example, by a suitable camera which may be mounted in a stationary position or in a moving position, such as on a drone, for example. The image recognition system is in communication with a remote system such as a premises management system. The remote system can determine, based on images captured by the image recognition system whether an authorized user associated with the closure device is present on the premises. If an authorized user is determined not to be present on the premises, an alert can be issued.

21 Claims, 3 Drawing Sheets

SYSTEM AND METHOD FOR PREMISES MONITORING

TECHNICAL FIELD

The present disclosure relates generally to the field of access control and more particularly to a system and method for monitoring premises.

BACKGROUND AND SUMMARY

Access control problems exist in different commercial and personal environments such as self-storage facilities, warehouses, marinas, businesses, cargo shipping, home rentals, recreational activity locations, sports clubs and other locations. Different types of assets, whether physical or virtual, may be protected from general access through one or more access control features such as a gate surrounding a premises, a physical lock such as a combination lock and/or electronic security and surveillance measures. Electronic security may require that a person seeking access to a premises provide a badge, provide proof of identification, provide some form of authentication such as by mobile telephone or password, and/or have an account that is current and not overdue. Surveillance on premises can take the form of cameras, physical presence sensors, motion detectors, weight sensors, human security personnel and other forms.

In some environments such as self-storage facilities, a tenant may be required to prove identification and/or be authenticated before a gate is opened for the entire premises. The tenant will further be required to present a key or know a combination to a lock before access is granted to the tenant's storage unit. The tenant may further be under video surveillance while on the premises, as one or more surveillance cameras may be in place to record actions taken at the facility. Unfortunately, nearly every physical facility is subject to security risks and those risks and potential losses increase whenever a closure device intended to protect internal contents is left open over time. In a storage facility context, if one unit is left open and unattended, other tenants or nefarious actors would have access to and can remove the contents of the unit, creating loss for the unit's owner, renter and/or tenant.

According to embodiments of the present disclosure, an image recognition system can detect a closed status and an ajar status for a closure device such as a storage unit at a premises. The detection can be, for example, by a suitable camera which may be mounted in a stationary position or in a moving position, such as on a drone, for example. The image recognition system is in communication with a remote system such as a premises management system. The remote system, the image recognition system or other device can determine, based on images captured by the image recognition system whether an authorized user associated with a closure device having an ajar status is present on the premises. If an authorized user is determined not to be present on the premises while the user's storage unit is ajar, an alert can be issued.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims. In addition, the present disclosure describes, among other things, a premises management system, device and method. Although embodiments herein are described with respect to their application in certain environments and locations, it is understood that the presently described embodiments can be implemented in any setting where access control may be useful.

It will be appreciated that reference to "a", "an" or other indefinite article in the present disclosure encompasses one or more than one of the described element. Thus, for example, reference to a closure device may encompass one or more closure devices, a communications device may encompass one or more communications devices and so forth.

Figure 1:
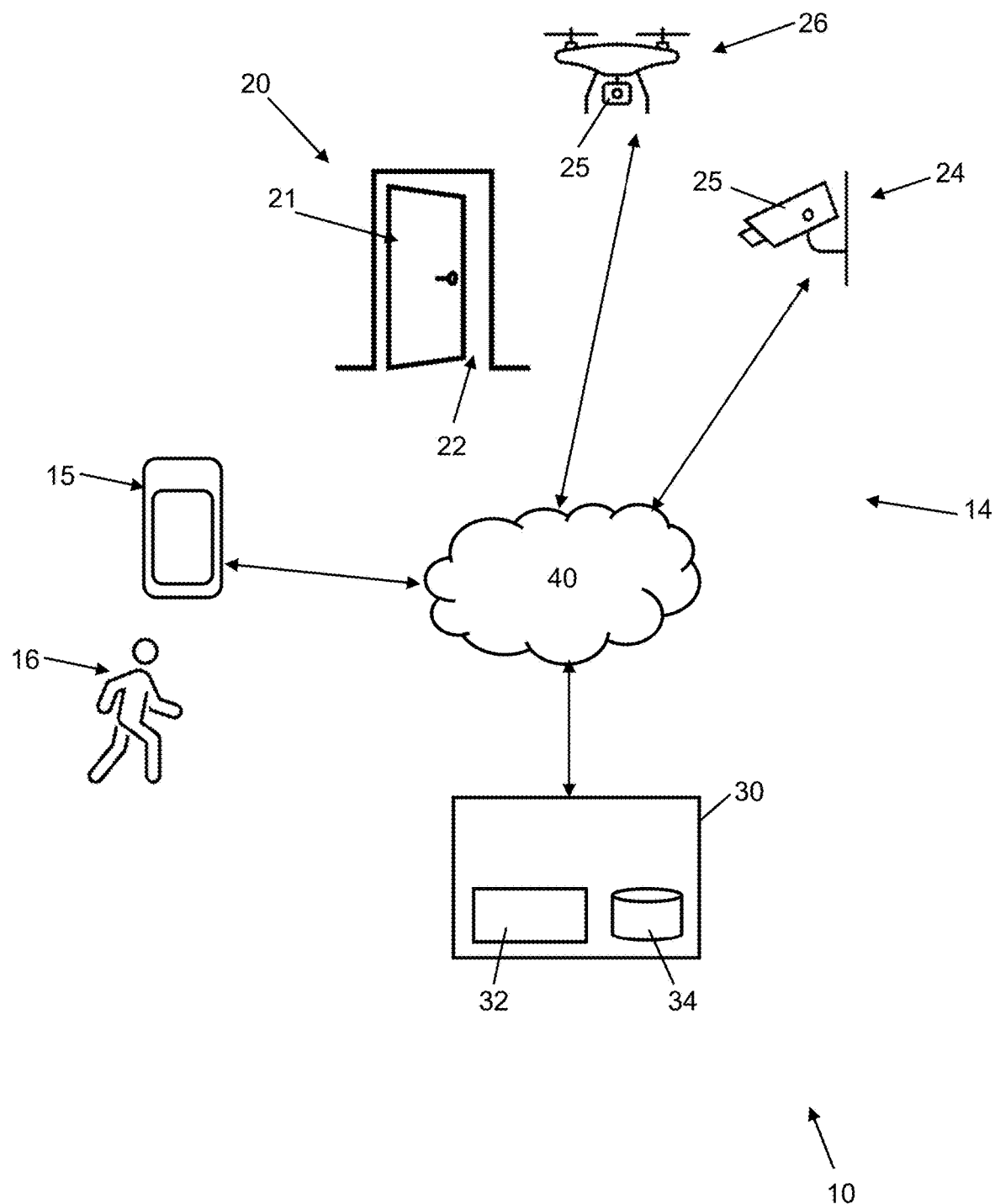
FIG. 1 is a schematic diagram illustrating embodiments of the present disclosure.

FIG. 1 is a schematic diagram of an access control system 10 in accordance with embodiments of the present disclosure. In various embodiments, the system can be implemented in connection with a self-storage and/or other access control environments, shown generally at 14. As shown in FIG. 1, a user 16 has a communications device 15, which may be a mobile communications device and which is capable of communication with a premises management system 30 over a network 40. The premises management system 30 can be or include premises monitoring device(s) and/or software. The network 40 may be any type of network suitable to allow interaction between devices, such as a mobile device 15 located at the access-controlled location and the premises management system 30. For example, the network 40 may be a wired network, a wireless network, or any combination thereof. Further, the network 40 may include a distributed computing network, an intranet, a local-area network (LAN) and/or a wide-area network (WAN), or any combination thereof. For example, the LAN may make use of WIFI in its many variations and the WAN may make use of broadband, cellular and/or satellite networks using technologies including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies. However, those of ordinary skill in the art will appreciate that the network 40 is not limited thereto.

It will be appreciated that the mobile communications device 15 is not limited to a mobile phone, and can include tablets, wearable devices, personal digital assistants (PDAs), laptop computers, "smart" watches, "smart" glasses, and any other device capable of receiving input from the customer, and which is capable of being connected to the network 40.

The user 16 may desire to access a closure device 20 which can take a variety of forms but which may include a wall, door, barricade or other physical feature (e.g., 21) that can exist in a closed status and an open or ajar status. In the example shown in FIG. 1, door 21 has an ajar status as indicated at 22. An image recognition system or device can be provided in the form of one or more surveillance cameras 25 which can be stationary as indicated at 24 or mobile as indicated by drone 26. In stationary form, the camera(s) may be secured to a pole, wall, rooftop or other physically stationary device. The image recognition system or device, including one or more cameras 25 and/or devices to which the cameras are affixed can include a processor and software instructions operable to recognize images and status information. For example, one or more cameras 25 can capture an image of closure device 20 and the image recognition system or device can detect whether the closure device has a closed or ajar status. One or more cameras 25 can also detect the presence of a user such as user 16 and can further interact with and detect the user's communications device 15. While the image recognition system or device can operate entirely locally via the camera and local processing, the image recognition system or device can also operate as part of premises management system 30, which can include a processor 32 and a memory 34 storing instructions for operations as described herein. In addition to optionally processing and recognizing images, the premises management system 30 can also operate to detect whether the user 16 has properly gained access to the premises, such as by providing a badge or other form of identification at a premises gate, for example. The premises management system 30 can also operate to detect whether the user 16 is onsite at the premises if and when the closure device 20 associated with the user 16 is determined to be in an ajar status.

Figure 2:
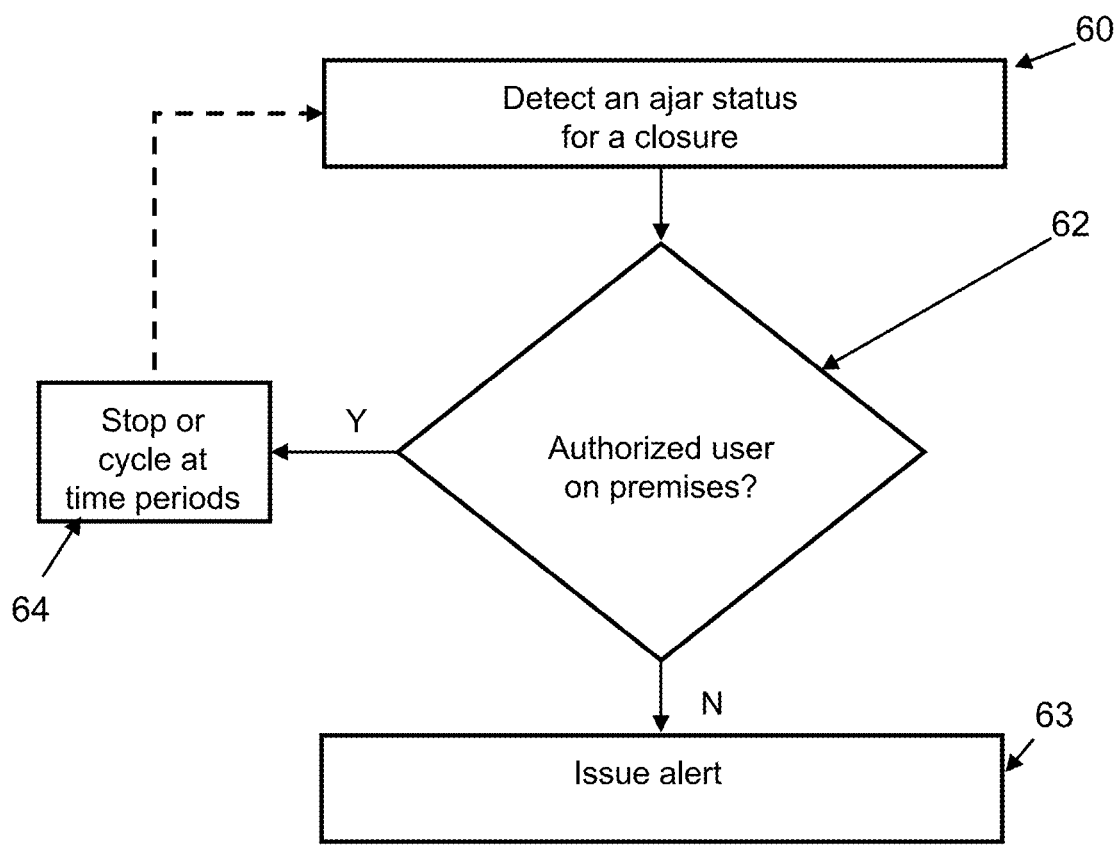
FIG. 2 is a flow diagram illustrating aspects of the present disclosure.

According to various embodiments as disclosed herein and as shown in FIG. 2, a computer-implemented method for premises monitoring includes, as at 60, detecting an ajar status for a closure and/or a closure device at a premises. The detection can be, for example, by an image recognition system or device in the form of, or including, a camera, for example. As at 62, a determination is made as to whether an authorized user associated with the closure device is present on the premises. This determination can be made, for example, by a camera (25 in FIG. 1) seeing a user (16 in FIG. 1) who may be determined to be an authorized user by a variety of approaches, including by biometric identification and/or access credential identification. In various embodiments, the determination whether the authorized user associated with the closure device is present on the premises is made by determining whether a credential associated with the authorized user has been employed to access the premises. In various other embodiments, the access credential identification can be made, for example, by determining that the user is, has or knows a required credential. The credential can be the user's communication device 15, a physical fob or card, a password the user knows and other form(s) of credentials. The credential can further be a biometric feature such as facial features that are recognized by one or more cameras and compared to one or more stored images of an authorized user associated with the account tied to the closure device. If a determination is made that an authorized user associated with the closure or closure device is present, then as at 64, the inquiry can stop, or optionally can return to 60 and await the detection of an ajar status for the closure device. In various embodiments, the return to 60 occurs at regular and/or predetermined time intervals. If an authorized user associated with the ajar closure device is not determined to be on the premises, an alert is issued as at 63. The alert can be, for example, an electronic message to a user such as a text message or an e-mail message. The alert can be, for example, a telephone call to a user's device. The alert can be a trigger to a visual and/or auditory alarm on the premises. The alert can be a communication to law enforcement and/or emergency personnel as pertaining to potentially criminal behavior. The alert can further be an instruction to the door or barrier of the closure device to close and lock, where such door or other barrier is so enabled by sufficient power and electrical or electronic processing, as will be understood to those of skill in the art. In various embodiments, the location where an authorized user is detected can be evaluated to determine whether the authorized user is within a specified distance of the ajar closure device, even if the user is still on the premises. For example, if a user opens his or her closure device, leaves it open, and then moves a distance away from the closure device such as to an office building on the premises that is over a certain distance away from the closure device (e.g., one hundred feet), an alert can be triggered.

Figure 3:
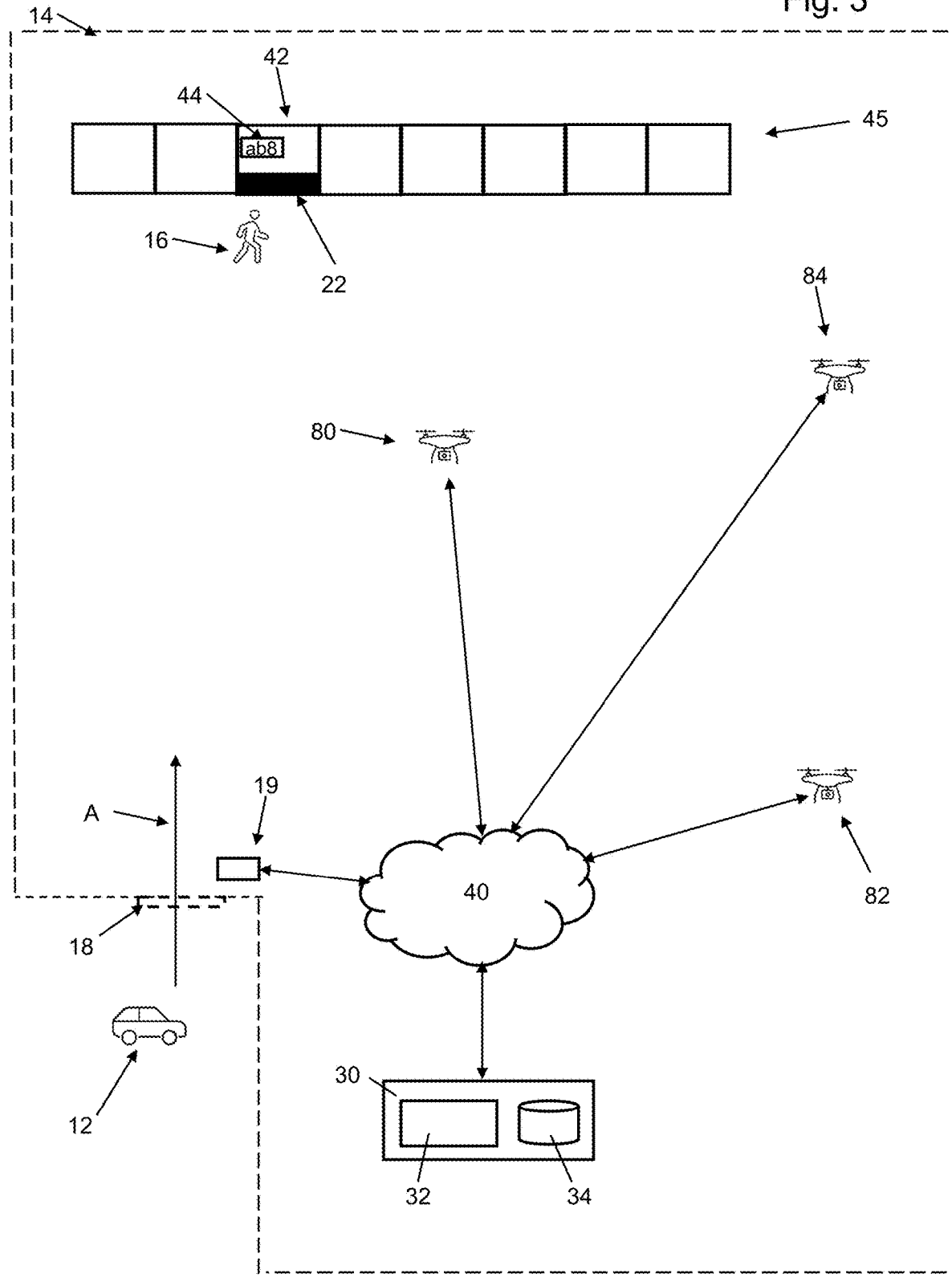
FIG. 3 is a schematic diagram illustrating embodiments of the present disclosure.

FIG. 3 is a schematic diagram illustrating further embodiments according to the present disclosure. A gate opening system for a facility such as a self-storage facility may rely on a code such as a four-digit code and a keypad to open the gate 18 as the default option. As a user approaches the gate 18 of a facility 14, such as by vehicle 12, the user can enter the code which can be processed by a local control unit 19 or by a premises management system 30. Once the correct code is entered and processed, and/or once any other identification or authentication requirements are met, the user is allowed to proceed into the premises, such as by driving vehicle 12 along path A. The user 16 may exit the vehicle 12 when inside the premises so as to take action such as opening the user's storage unit 42, which can be considered a closure device according to the present disclosure. In various embodiments, the storage unit 42 may be provided with a unit number 44 that is visible on an exterior thereof. If the user opens the storage unit 42, an opening such as shown at 22 can be detected by an image recognition system as described elsewhere herein. One or more cameras, such as cameras onboard one or more drones 80, 82, 84, can detect the ajar status of the storage unit 42. According to various embodiments, the cameras can further detect the storage unit number 44 visually and directly such as through optical character recognition (OCR), or indirectly by recognizing which unit 42 has an ajar status from among a group 45 of units. For example, if the group 45 of units is known to be a line of eight units, the ajar unit 42 can be detected as being the third unit in the line of eight units in the group 45. In further embodiments, the image recognition system or device can detect a feature of the closure device such as a door with a colored tag or label on it. The system can operate so as to detect other physical features such as a combination padlock that is identifiable or a dent at some identifiable location that is detectable by the camera. The system can further operate to determine the unit involved based upon the camera's location of image capture by comparing the camera's location of image capture to the location of the unit having an open door and resolving the identity of the unit based upon the calculated location of the unit versus a registry of unit locations. Regardless of approach, once the unit is determined, the system can determine what user or users are authorized users associated with the ajar unit 42. This determination can be performed locally or through a premises management system 30 having a processor 32 and memory 34 as described in connection with FIG. 1. A determination is then made as to whether an authorized user is on the premises as described elsewhere herein.

It will be appreciated that embodiments of the image recognition system according to the present disclosure are trained to ascertain a closed status and an ajar status for the closure device. In some embodiments, the image recognition system is or is associated with a drone (e.g., 24 in FIGS. 1 and 80, 82, 84 in FIG. 3). In various other embodiments, the image recognition system is or is associated with a stationary support (e.g., 26 in FIG. 1). In various embodiments, the closed status can be determined visually by the image recognition system or device, or through sensors and/or electronic communication, such as when a physical contact detector senses that a closure device is closed, for example.

In various embodiments, determining whether an authorized user associated with the closure device is present on the premises involves requesting, by the image recognition system, presence status information from a premises management system. The request for presence status information can include an identification of the closure device, such that the premises management system can employ the identification of the closure device in determining one or more associated users of the closure device and initiate further action based thereon. According to various embodiments, the request for presence status information can be through an application programming interface (API) call or by the image recognition system receiving a push notification such as a webhook notification from the premises management system, for example. It will be appreciated that embodiments of the present disclosure contemplate that the image recognition system and premises management system can be part of the same system. It will further be appreciated that detecting the ajar status as described herein can involve detecting that the closure device is ajar for a minimum time period.

According to various embodiments as disclosed herein and as shown in the drawings, a system is provided for premises monitoring and can include, for example, an image recognition system or device, which can be or include a camera 25, for example. The overall system can further include a premises management system 30. The system can further include a control device, wherein the control device includes a processor and a memory storing instructions operable to receive a detection from the image recognition system that a closure device at a premises has an ajar status, determine whether an authorized user associated with the closure device is present on the premises and upon an authorized user not determined to be present on the premises, issue an alert. The control device can be a controller or processor of a premises monitoring or management system and/or a controller or processor of the image recognition system or device.

In various embodiments, determining whether an authorized user associated with the closure device is present on the premises involves requesting, by the image recognition system, presence status information from a premises management system. The request for presence status information can include an identification of the closure device, such that the premises management system can employ the identification of the closure device in determining one or more associated users of the closure device and initiate further action based thereon. It will be appreciated that detecting the ajar status as described herein can involve detecting that the closure device is ajar for a minimum time period.

Although the present disclosure may be described in instances with respect to self-storage facilities, it will be appreciated that embodiments of the present disclosure can be implemented in any setting where access control for a closure or closure device may be useful, such as hotel rooms, apartment buildings, storage containers, short-term housing rentals, lockers and other environments as described herein, for example. In addition, the present disclosure can be implemented within a controlled access system (CAS), such as for equipment rooms, vaults, hospitals, airports, government facilities, nuclear power facilities, water treatment facilities, weapon storage facilities, aircraft cockpits, and any other setting that requires restricted, selective, or monitored access. Environments and/or locations in which embodiments of the present disclosure may operate include, in addition to self-storage facilities, education and membership environments with locks on school lockers and/or sports club lockers, transportation environments with locks on cargo containers, utility environments with locks on natural gas meters, transformer boxes or other physical utility feature, marinas and boat storage environments with locks on boats such as may be used to secure the boats to a dock or a mooring piling, parcel delivery environments where locks are used to secure containers for at-home delivery, shared transport environments such as may be used for temporary use of bikes, scooters, and other forms of transportation, for example.

As used herein, the term "customer" can include a renter, client, tenant, lessee, user, owner or an authorized agent, and the term "user" can be used interchangeably with "customer" herein.

In various embodiments, it will be appreciated that the customer can designate authorized parties beyond the customer to be identified upon seeking for an authorized user on the premises after detecting an ajar status of a closure device. For example, a customer's spouse, authorized agents, business associates, attorneys, and any other parties whom the customer wishes to have access to the access-controlled location can have their credentials associated with the access-controlled location. In such embodiments, the database record (e.g., 34) for the closure device at the access-controlled location includes a listing of all authorized parties and their respective credentials. Embodiments as disclosed herein can then, upon detecting an ajar status of a closure device, seek confirmation that at least one authorized user associated with the closure device is present and/or within a predetermined distance of the closure device.

In certain embodiments in which the system includes a computing device, such as a mobile communications device, a premises management system, an image recognition system or device, a remote server, etc., the computing device is any suitable computing device (such as a server) that includes at least one processor and at least one memory device or data storage device. As further described herein, the computing device includes at least one processor configured to transmit and receive data or signals representing events, messages, commands, or any other suitable information between the computing device and other devices. The processor of the computing device is configured to execute the events, messages, or commands represented by such data or signals in conjunction with the operation of the computing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A computer-implemented method for premises monitoring, comprising:
   detecting, via an image recognition system comprising a camera, an ajar status for a closure device at a premises, wherein the ajar status for the closure device is determined by the camera detecting a closure device number;
   identifying the closure device, via the camera, from a group of premises closure devices based on a visible feature or location of the closure device;
   using the identification of the closure device, determining an authorized user associated with the closure device and determining whether the authorized user associated with the closure device is present on the premises; and
   upon an authorized user not determined to be present on the premises, issuing an alert.

2. The computer-implemented method of claim 1, wherein the image recognition system is trained to ascertain a closed status and an ajar status for the closure device.

3. The computer-implemented method of claim 1, wherein the image recognition system comprises a drone.

4. The computer-implemented method of claim 1, wherein the image recognition system comprises a stationary support.

5. The computer-implemented method of claim 1, wherein determining whether an authorized user associated with the closure device is present on the premises comprises requesting, by the image recognition system, presence status information from a premises management system.

6. The computer-implemented method of claim 5, wherein the request for presence status information comprises an identification of the closure device.

7. The computer-implemented method of claim 1, wherein the alert comprises an electronic communication or an audible alarm.

8. The computer-implemented method of claim 1, wherein the alert comprises an instruction to a premises management system to close the closure device.

9. The computer-implemented method of claim 1, wherein detecting the ajar status comprises detecting that the closure device is ajar for a minimum time period.

10. The computer-implemented method of claim 1, wherein the ajar status for the closure device is determined by the camera based on a position of the closure device within a series of closure devices.

11. The computer-implemented method of claim 1, wherein the closure device is identified from the group of premises closure devices by comparing a location of image capture from the camera to the location of the closure device.

12. A system for premises monitoring, comprising:
   an image recognition system comprising a camera;
   a premises management system; and
   a processor and a memory storing instructions, wherein the instructions are operable to cause the processor to:
      receive a detection from the image recognition system that a closure device at a premises has an ajar status, wherein the ajar status for the closure device is determined by the camera detecting a closure device number;
      identify the closure device, via the camera, from a group of premises closure devices based on a visible feature or location of the closure device;
      using the identification of the closure device, determine an authorized user associated with the closure device and determine whether the authorized user associated with the closure device is present on the premises; and
      upon an authorized user not determined to be present on the premises, issue an alert.

13. The system of claim 12, wherein the image recognition system is trained to ascertain a closed status and an ajar status for the closure device.

14. The system of claim 12, wherein the image recognition system comprises a drone.

15. The system of claim 12, wherein the image recognition system comprises a stationary support.

16. The system of claim 12, wherein determining whether an authorized user associated with the closure device is present on the premises comprises receiving a request, by the premises management system, for presence status information from image recognition system.

17. The system of claim 16, wherein the request for presence status information comprises an identification of the closure device.

18. The system of claim 17, wherein the instructions are further operable to cause the processor to determine whether the authorized user associated with the closure device is present on the premises by determining whether a credential associated with the authorized user has been employed to access the premises.

19. The system of claim 12, wherein the alert comprises an electronic communication or an audible alarm.

20. The system of claim 12, wherein the alert comprises an instruction to a premises management system to close the closure device.

21. The system of claim 12, wherein detecting the ajar status comprises detecting that the closure device is ajar for a minimum time period.

* * * * *